(12) United States Patent
Cha et al.

(10) Patent No.: US 10,720,856 B2
(45) Date of Patent: Jul. 21, 2020

(54) COMPOSITE ACTUATOR DEVICE DRIVEN BY AN ELECTROSTATIC ATTRACTIVE FORCE WHEN A VOLTAGE IS APPLIED

(71) Applicant: KOREA INSTITUTE OF SCIENCE AND TECHNOLOGY, Seoul (KR)

(72) Inventors: Youngsu Cha, Seoul (KR); Kahye Song, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 93 days.

(21) Appl. No.: 16/170,461

(22) Filed: Oct. 25, 2018

(65) Prior Publication Data

US 2020/0076328 A1 Mar. 5, 2020

(30) Foreign Application Priority Data

Sep. 4, 2018 (KR) .................. 10-2018-0105390

(51) Int. Cl.
*H02N 1/00* (2006.01)
*H01L 41/09* (2006.01)
*C08K 3/22* (2006.01)

(52) U.S. Cl.
CPC ............... *H02N 1/006* (2013.01); *C08K 3/22* (2013.01); *C08K 2003/2275* (2013.01)

(58) Field of Classification Search
CPC ........ H02N 1/006; H02N 1/004; H02N 1/002; H02N 1/00; H01L 41/053; H01L 41/16; H01L 41/09; H01L 41/18; H01L 41/0933; H01L 41/094; H01L 41/096; H01L 41/193; H01L 41/047
See application file for complete search history.

(56) References Cited

U.S. PATENT DOCUMENTS

| 9,705,429 B2* | 7/2017 | Sugawara | B63C 9/0005 |
| 9,796,159 B2* | 10/2017 | Kang | B32B 15/092 |
| 9,996,199 B2* | 6/2018 | Park | G06F 3/044 |
| 2003/0107301 A1 | 6/2003 | Asano et al. | |
| 2005/0200984 A1 | 9/2005 | Browne et al. | |

(Continued)

FOREIGN PATENT DOCUMENTS

| EP | 2 542 271 B1 | 2/2014 |
| KR | 10-1095024 B1 | 12/2011 |

(Continued)

OTHER PUBLICATIONS

L. Z. Chen et al., "Electrothermal actuation based on carbon nanotube network in silicone elastomer", Applied Physics Letters, 2008, pp. 263104, vol. 92.

(Continued)

*Primary Examiner* — Edgardo San Martin
(74) *Attorney, Agent, or Firm* — Rabin & Berdo, P.C.

(57) ABSTRACT

A composite actuator device includes a composite material that is configured to be driven by applying power thereto and that is composed of a silicone; and from 1 to 20 wt % of an iron oxide mixed in the silicone; and a metal plate that is spaced apart from the composite material by a predetermined distance. When the power is applied, the composite actuator is driven toward the metal plate by an electrostatic attractive force. Preferably, the composite actuator device has a resonance frequency of 3±0.1 Hz.

8 Claims, 6 Drawing Sheets

(56) References Cited

U.S. PATENT DOCUMENTS

| | | | |
|---|---|---|---|
| 2009/0135541 A1* | 5/2009 | Kawakubo | B81B 3/0021 |
| | | | 361/290 |
| 2010/0212762 A1 | 8/2010 | Toonder et al. | |
| 2013/0049530 A1 | 2/2013 | Koo et al. | |
| 2019/0103548 A1* | 4/2019 | Sugawara | H01L 41/113 |
| 2020/0019246 A1* | 1/2020 | Cha | G06F 3/016 |

FOREIGN PATENT DOCUMENTS

| | | |
|---|---|---|
| KR | 10-1790880 B1 | 10/2017 |
| KR | 10-1812445 B1 | 12/2017 |

OTHER PUBLICATIONS

Cevher Ak et al., "A New Analytical Model to Estimate the Voltage Value and Position of the Pull-In Limit of a MEMS Cantilever", Micromachines, 2016, pp. 1-12, vol. 7, No. 53.

\* cited by examiner

FIG. 4

| CONCENTRATION (wt%) | DISPLACEMENT (mm) |
|---|---|
| 1 | 3.10 |
| 1.5 | 3.92 |
| 2 | 4.29 |
| 2.5 | 4.98 |
| 5 | 5.19 |
| 10 | 4.94 |
| 20 | 4.78 |

COMPOSITE ACTUATOR DEVICE DRIVEN BY AN ELECTROSTATIC ATTRACTIVE FORCE WHEN A VOLTAGE IS APPLIED

CROSS-REFERENCE TO RELATED APPLICATION

This application claims priority to Korean Patent Application No. 10-2018-0105390, filed on Sep. 4, 2018, and all the benefits accruing therefrom under 35 U.S.C. § 119, the contents of which in its entirety are herein incorporated by reference.

BACKGROUND

1. Field

The present disclosure relates to a composite actuator device, and more particularly, to a composite actuator device driven by an electrostatic force using charge polarization of an iron oxide and a silicone composite.

2. Description of the Related Art

As an example of a flexible actuator, an electroactive polymer (EAP) actuator is known in the art.

The EAP refers to an 'electroactive polymer' that shrinks when electricity is transmitted, and the EAP is used for artificial limbs for disabled persons who require muscle movement, airship wings, artificial heart valves, and artificial skins of fish robots.

The electroactive polymer (EAP) actuator is driven by electrical stimulation and chemical stimulation such as optics and heat.

In addition, the EAP actuator includes a dielectric and an elastic actuator, and the electric field-induced activation reaction is triggered by an electrostatic attraction force between two charged conductive layers.

An ion EAP actuator operates by the movement of ions within a polymer. The ion EAP actuator varies discretely due to small changes in external variables, temperature, solvent quality and pH. Examples of the ion EAP include polymer electrolyte gel, conductive polymer and bucky gel actuators.

Recently, research on new materials and its manufacturing has been continued, and it is required to develop actuators capable of improving thermal stability and mechanical performance of materials.

SUMMARY

The present disclosure is directed to providing an actuator device, which may improve thermal stability and mechanical performance of materials.

In one aspect, there is provided a composite actuator device, comprising a composite actuator including a silicone and an iron oxide disposed to be mixed inside the silicone, the composite actuator being configured to be driven by applying a power thereto, wherein the composite actuator includes the iron oxide in an amount of 1 to 20 wt %.

In an embodiment of the present disclosure, the iron oxide may be $Fe_3O_4$.

In another embodiment of the present disclosure, the composite actuator device of the present disclosure may further comprise a metal plate installed to be spaced apart from the composite actuator by a predetermined distance, wherein when a power is applied, the composite actuator may be driven toward the metal plate by an electrostatic attractive force.

Preferably, the composite actuator may include the iron oxide in an amount of 4.9 to 5.1 wt %.

The composite actuator may have a resonance frequency of 3±0.1 Hz.

BRIEF DESCRIPTION OF THE DRAWINGS

FIG. 4 is a table showing a displacement at each concentration of iron oxide of the composite actuator at a resonance frequency.

DETAILED DESCRIPTION

Hereinafter, the embodiments disclosed in this specification will be described in detail. Here, identical or similar components are denoted by identical or similar reference symbols and not described in detail again. In the following description, the word "unit" used in terms is selected or endowed only in consideration of ease naming and does not have any distinguishable meaning or role. In addition, in the following description of the embodiments of the present disclosure, any detailed description of related arts can be omitted if it is determined that the gist of the embodiments disclosed herein can be obscured by the same. Moreover, it should be understood that the accompanying drawings are just for better understanding of the embodiments disclosed herein and are not to be construed as limiting the scope of the present disclosure. The scope of the present disclosure should be understood as including all changes, equivalents and alternatives thereof.

Terms having an ordinal such as "first" and "second" can be used for explaining various components, but the components are not limited by the terms. These terms are just used for distinguishing any component from another.

In case it is mentioned that any component is "connected" to another component, the component may be connected directly to another component, but it should be understood that any other component can be further interposed between them.

The singular expressions are intended to include the plural forms as well, unless the context clearly indicates otherwise.

In this specification, the term such as "include" and "have" is just to specify the presence of features, integers, steps, operations, elements, parts or components thereof, stated in the specification, but does not preclude the presence or addition of one or more other features, integers, steps, operations, elements, parts or components thereof.

First, a composite actuator device 100 according to the present disclosure includes a composite actuator 10.

The composite actuator 10 includes a silicone 13 and an iron oxide 17, and the composite actuator 10 is configured to be driven by applying a power thereto.

When a power is applied, charges are polarized at the iron oxide 17, and the silicone 13 is driven by an electrostatic force between an electrode of an external panel and the iron oxide.

The iron oxide 17 is disposed to be mixed inside the silicone 13. When a power is applied to polarize charges, the iron oxide 17 generates an electrostatic attractive force to the external panel.

For example, the iron oxide 17 may be formed by solidifying together with the silicone 13 so that it is distributed inside the silicone 13 here and there in a lump shape.

Figure 1:
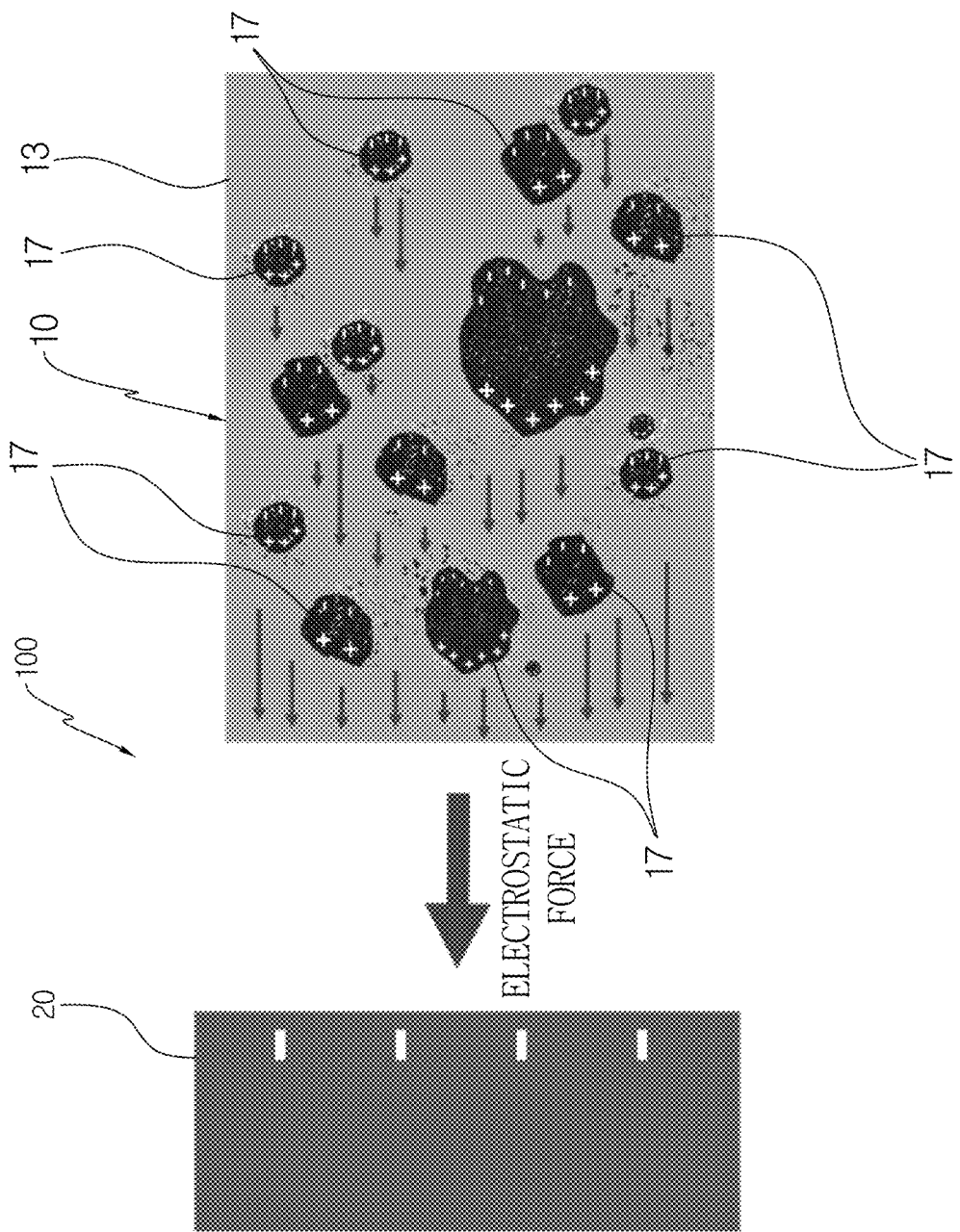
FIG. 1 is a diagram showing an example of a composite actuator device, where an electrostatic force is generated at the composite actuator of the present disclosure by charge polarization.

FIG. 1 shows an example where the iron oxide 17 is disposed in the silicone 13 to be distributed inside the silicone 13 here and there in a lump shape, and an electrostatic force is generated by charge polarization of the iron oxide 17.

In the composite actuator 10, the amount of the iron oxide 17 is 1 to 20 wt %. For example, the amount of the iron oxide 17 may be 4.9 to 5.1 wt %. In addition, in the composite actuator device 100 of the present disclosure, the iron oxide 17 may be an iron oxide 17 with a chemical formula $Fe_3O_4$.

A power source may be electrically connected to the composite actuator 10 to apply a power thereto.

The composite actuator device 100 of the present disclosure may further include a metal plate 20. When a power is applied, the composite actuator 10 may be driven toward the metal plate 20 by the electrostatic attractive force.

The metal plate 20 may be disposed in parallel to the composite actuator 10. So, when a power is applied, the composite actuator 10 is driven to move close to the metal plate 20.

The metal plate 20 may be made of, for example, aluminum (Al).

Powers with different polarities are preferably applied to the metal plate 20 and the composite actuator 10.

Figure 2:
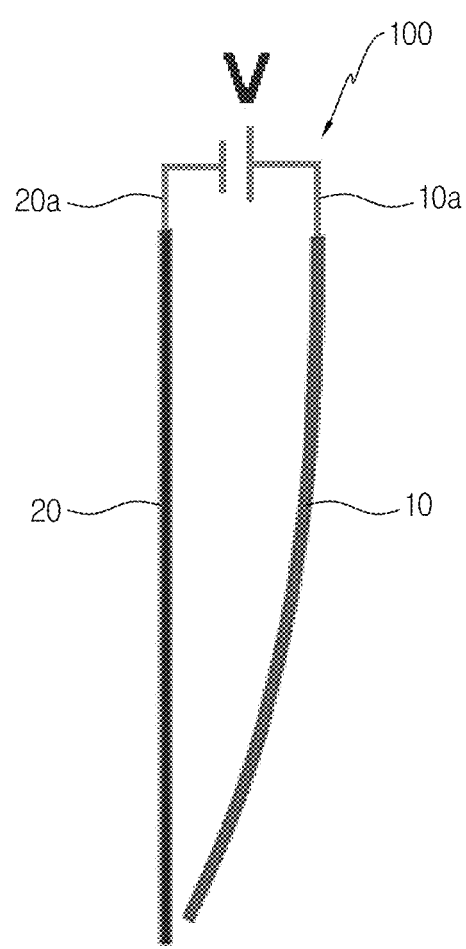
FIG. 2 is a diagram showing an example of the composite actuator device according to the present disclosure.

FIG. 2 shows an example where electrodes 10a, 20a of different polarities are connected to the composite actuator 10 and the metal plate 20.

In addition, the composite actuator 10 preferably has a resonance frequency of 3±0.1 Hz in order to allow maximum actuation of the composite actuator 10.

Due to this configuration, the composite actuator device 100 of the present disclosure is driven by means of an electrostatic force using charge polarization.

Figure 3A:
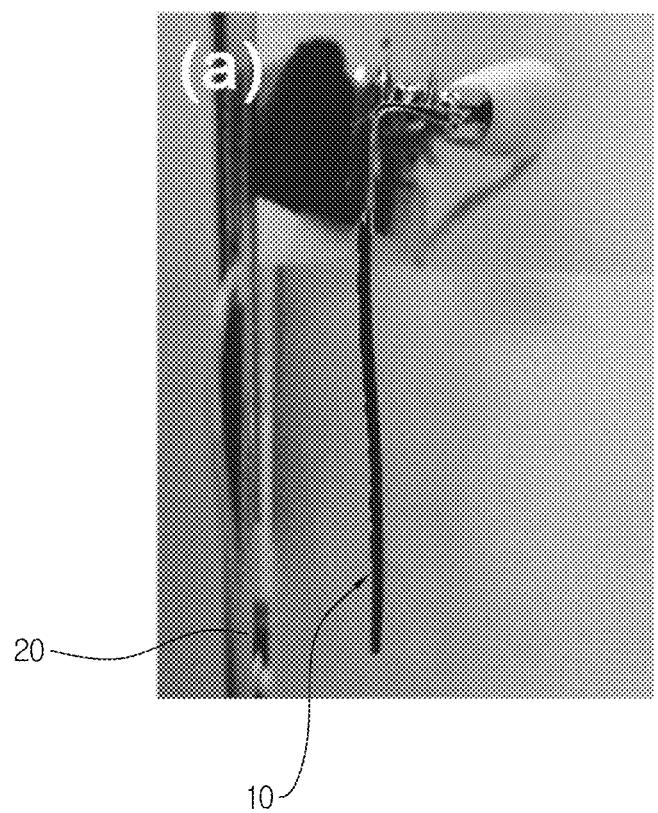
FIG. 3A is a diagram showing a state of the composite actuator before operation.
Figure 3B:
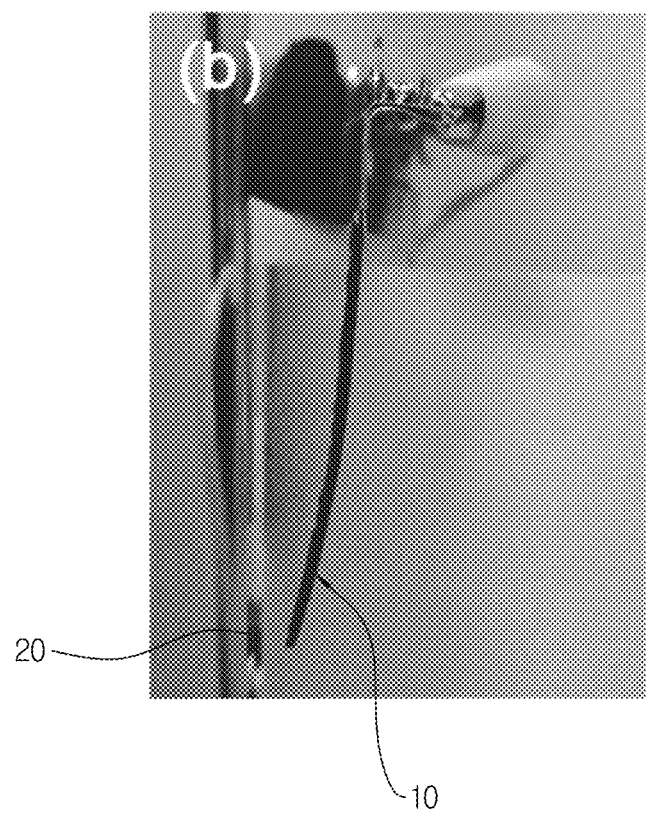
FIG. 3B is a diagram showing an example where the composite actuator is driven toward a metal plate.
Figure 3C:
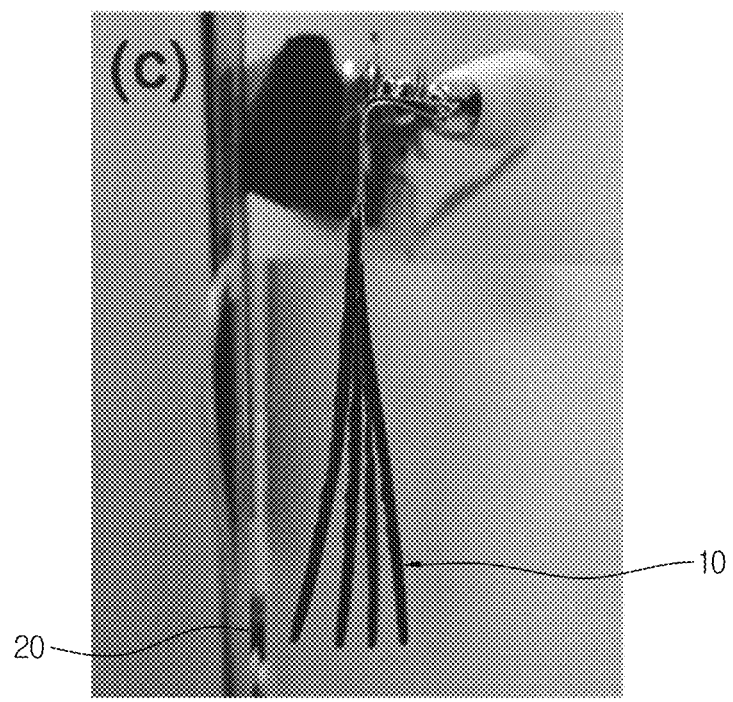
FIG. 3C is a diagram showing another example where the composite actuator is driven toward the metal plate.

FIG. 3A shows a state before the composite actuator 10 operates, FIG. 3B shows an example where the composite actuator 10 is driven toward the metal plate 20, and FIG. 3C shows an example where the composite actuator 10 is driven to vibrate toward the metal plate 20.

FIG. 4 shows a displacement at each concentration of the iron oxide 17 of the composite actuator 10, at the composite actuator device 100 according to the present disclosure. Here, the iron oxide 17 has a displacement of 3.1 mm at a concentration of 1 wt %, a displacement of 3.92 mm at a concentration of 1.5 wt %, a displacement of 4.29 mm at a concentration of 2 wt %, a displacement of 4.98 mm at a concentration of 2.5 wt %, a displacement of 5.19 mm at a concentration of 5 wt %, a displacement of 4.94 mm at a concentration of 10 wt %, and a displacement of 4.78 mm at a concentration of 20 wt %.

From the results in FIG. 4, it can be found that a maximum displacement is generated when the iron oxide 17 has a concentration of about 5 wt %.

Meanwhile, the composite actuator device 100 of the present disclosure may be utilized for patient rehabilitation, soft robot parts, continuum robots, small drilling devices, and vibration generation or tactile feedback devices.

The composite actuator device of the present disclosure may be driven by an electrostatic force between an electrode of an external panel and the composite as charges are polarized at an iron oxide in the composite actuator when a voltage is applied thereto.

The composite actuator device of the present disclosure may be utilized for patient rehabilitation, soft robot parts, continuum robots, small drilling devices, and vibration generation or tactile feedback devices.

The composite actuator device 100 described above is not limited to the configuration and method of the embodiments described above, and the embodiments may be modified in various ways by selectively combining all or a part of the embodiments.

It will be apparent to those skilled in the art that the present disclosure can be embodied in other specific forms without departing from the essential characteristics of the present disclosure. Accordingly, the above detailed description should be considered in all respects as illustrative and not restrictive. The scope of the present disclosure shall be determined by rational interpretation of the appended claims, and all changes within the equivalence scope of the present disclosure shall fall within the scope of the present disclosure.

What is claimed is:

1. A composite actuator device, comprising:
    a composite actuator that comprises a silicone; and from 1 to 20 wt % of iron oxide particles that are mixed in the silicone and that have a lump shape; and
    a single electrode that is connected to one end of the composite actuator and that has an electrical polarity configured to charge polarize the iron oxide particles when a voltage is applied between the electrode and an external object that is spaced apart from the composite actuator and that has an opposite electrical polarity such that the composite actuator is driven to move toward the external object by an electrostatic force between the iron oxide particles and the external object.

2. The composite actuator device according to claim 1, wherein the iron oxide is $Fe_3O_4$.

3. A composite actuator device, comprising:
    a composite actuator including a silicone; and from 1 to 20 wt % of iron oxide mixed in the silicone, the composite actuator being configured to be driven by applying a power thereto, and
    a metal plate installed to be spaced apart from the composite actuator by a predetermined distance,
    wherein the iron oxide is $Fe_3O_4$, and
    wherein, when power is applied, the composite actuator is driven toward the metal plate by an electrostatic attractive force.

4. The composite actuator device according to claim 2, wherein the iron oxide is present in an amount of from 4.9 to 5.1 wt %.

5. The composite actuator device according to claim 2, wherein the composite actuator device has a resonance frequency of 3±0.1 Hz.

6. The composite actuator device according to claim 1, wherein the external object is a metal plate.

7. The actuator device according to claim 3, wherein the composite actuator includes the iron oxide in an amount of 4.9 to 5.1 wt %.

8. The actuator device according to claim 3, wherein the composite actuator has a resonance frequency of 3±0.1 Hz.

* * * * *